Nov. 23, 1926.                                            1,607,842
R. C. NEWHOUSE
FEEDER
Filed April 24, 1926

Inventor
R. C. Newhouse
by
Attorney

Patented Nov. 23, 1926.

1,607,842

UNITED STATES PATENT OFFICE.

RAY C. NEWHOUSE, OF CHICAGO, ILLINOIS, ASSIGNOR TO ALLIS-CHALMERS MANUFACTURING COMPANY, OF MILWAUKEE, WISCONSIN, A CORPORATION OF DELAWARE.

FEEDER.

Application filed April 24, 1926. Serial No. 104,297.

This invention relates in general to improvements in feeders for fluent materials, and relates more specifically to improvements in the construction and operation of feed mechanisms for delivering granular materials or liquid to the interior of a rotary comminuting mill or the like.

An object of the invention is to provide a feeder which is simple in construction and efficient in operation. Another object of the invention is to provide improved means for feeding materials from a stationary element to a rotary element without permitting undesirable escape of the material through the joint of coaction between the elements.

A clear conception of an embodiment of the invention and of the operation of devices constructed in accordance therewith, may be had by referring to the drawing accompanying and forming a part of this specification in which like reference characters designate the same or similar parts in the various views.

Figure 1:
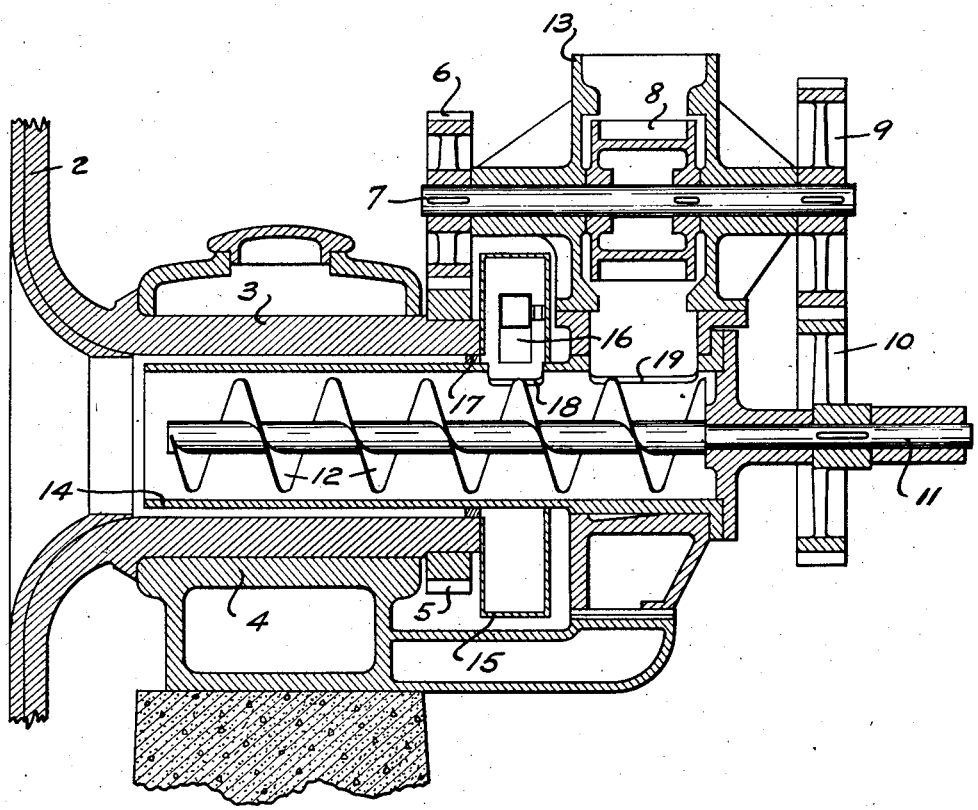
Fig. 1 is a central vertical section through an improved feeder especially adapted to deliver granular material to the interior of a comminuting mill.

The feeder disclosed in Fig. 1 comprises in general a stationary main feeder casing 13 having therein a rotary bucket wheel 8; a stationary horizontal sleeve 14 having a feed inlet opening 19 for receiving material by gravity from the bucket wheel 8; a feed screw 12 disposed within the sleeve 14 and rotatable to urge material admitted through the opening 19 toward the opposite end of the sleeve 14; and gearing for actuating the bucket wheel 8 and the feed screw 12. The stationary casing 13 and sleeve 14 are fixedly associated with a bearing 4 within which the hollow trunnion 3 is rotatably supported. The hollow trunnion 3 is rigidly connected to the end head 2 of a comminuting mill or other device to which material is to be fed, and the sleeve 14 extends into the hollow trunnion 3. A ring member 17 may be disposed between the sleeve 14 and the interior of the trunnion 3 for the dual purpose of affording support for the overhanging end of the sleeve 14, and of checking the escape of material from within the trunnion 3 around the exterior of the sleeve 14.

A gear 5 secured to the end portion of the trunnion 3 remote from the end head 2, meshes with a gear 6 secured to one end of a counter-shaft 7 which supports the bucket wheel 8. A gear 9 secured to the opposite end of the counter-shaft 7 meshes with a gear 10 secured to the shaft 11 which rotatably supports the feed screw 12.

The stationary sleeve 14 is provided with an upper return opening 18 directly adjacent to the end of the hollow trunnion 3, and a leakage collecting drum 15 secured to the end of the trunnion 3 surrounds the sleeve 14 at the opening 18. The drum 15 is rotatable with the trunnion 3 and snugly fits the sleeve 14 at the side of the opening 18 remote from the trunnion 3. Attached to and located within the drum 15 is a spiral return scoop 16 having an inlet opening at the periphery of the drum 15 and having a discharge opening closely adjacent to the sleeve 14 and movable in close proximity to the opening 18.

Figure 2:
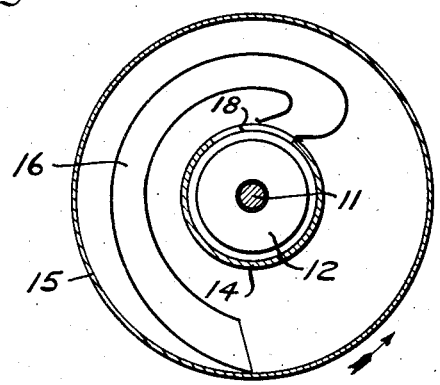
Fig. 2 is a transverse vertical section through the leakage preventing mechanism.

During normal operation of the feeder, granular material is delivered in bulk into the casing 13 and is discharged in regulated quantities by the bucket wheel 8 through the opening 19 into the stationary sleeve 14. The feed screw 12 conveys the material thus admitted to the sleeve 14 through the trunnion 3 and toward the comminuting mill or other device to which it is desired to feed the material. The rotating trunnion actuates the bucket wheel 8 and the feed screw 12 through the gearing 5, 6, 9, 10 and the shafts 7, 11. During rotation of the trunnion 3 the drum 15 and spiral scoop 16 are also caused to rotate in the direction indicated by the arrow in Fig. 2. Any material escaping from the trunnion past the ring 17 and into the drum 15 gravitates toward the bottom of the drum and is picked up by the spiral scoop 16, being eventually delivered into the sleeve 14 through the upper opening 18 and thus returned to the mill by the feed screw 12. As the sleeve 14 is never totally filled with material, no material will be discharged into the drum 15 by the feed screw 12, but if any material should accidentally be thus delivered into the drum 15, the return scoop 16 will quickly remove such material from the drum 15 and return it to the sleeve 14.

It will thus be noted that the leakage collecting drum 15 and the return scoop 16 effectively prevent undesirable escape of material since the joint between the drum 15 and the end of the trunnion 3 may readily be made tight. The elimination of tight fitting rotary packings furthermore eliminates wear when gritty material is being handled and the cost of the drum 15 and scoop 16 is negligible when the everlasting qualities of these elements is considered. The specific construction of the feeder to which the leakage preventing device has been applied herein forms no part of the present invention.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a hollow rotary trunnion, a stationary casing forming a conduit communicating with the interior of said trunnion, a leakage collecting drum rotatable with said trunnion and surrounding said casing, and means for transferring into said casing material which escapes from said trunnion to said drum.

2. In combination, a hollow rotary trunnion, a stationary sleeve extending into an end of said trunnion, a leakage collecting drum rotatable with said trunnion and surrounding said sleeve, and means for returning to said sleeve any material escaping from said trunnion to said drum.

3. In combination, a hollow rotary trunnion, a stationary sleeve extending into an end of said trunnion, a leakage collecting drum secured to an end of said trunnion and surrounding said sleeve, and a scoop rotatable with said drum for returning to the interior of said sleeve any material escaping from said trunnion to said drum.

4. In combination, a hollow rotary trunnion, a stationary sleeve for delivering material through said trunnion, said sleeve having an upper opening adjacent to the end of said trunnion, a leakage collecting drum secured to the end of said trunnion and surrounding said sleeve opening, and means for delivering through said opening material which passes from said trunnion into said drum.

5. In combination, a hollow rotary trunnion, a stationary sleeve for delivering material through said trunnion, said sleeve having an upper opening adjacent to the end of said trunnion, a leakage collecting drum secured to the end of said trunnion and surrounding said sleeve opening, and a scoop secured within said drum for delivering through said opening material passing from said trunnion into said drum.

In testimony whereof, the signature of the inventor is affixed hereto.

RAY C. NEWHOUSE.